United States Patent [19]
Spector et al.

[11] Patent Number: 5,883,169
[45] Date of Patent: Mar. 16, 1999

[54] LENS WAFERS WITH REMOVABLE COATING

[75] Inventors: David P. Spector, Sausalito; A. N. Sunder Ram, Petaluma, both of Calif.

[73] Assignee: Sola International Holdings Ltd., Lonsdale, Australia

[21] Appl. No.: 633,415

[22] Filed: Apr. 17, 1996

Related U.S. Application Data

[62] Division of Ser. No. 379,328, Jan. 26, 1995.

[51] Int. Cl.⁶ .......................... C08K 5/103; C08K 5/101; C08K 5/07; C08L 31/04
[52] U.S. Cl. .......................... 524/292; 524/315; 524/361; 524/365; 524/910; 524/563; 524/569; 525/222; 526/330
[58] Field of Search .......................... 524/292, 315, 524/361, 365, 563, 569, 910; 526/330; 525/222

[56] References Cited

U.S. PATENT DOCUMENTS

| | | | |
|---|---|---|---|
| 3,091,597 | 5/1963 | Henriques, III | 524/292 |
| 4,613,520 | 9/1986 | Dasgupta | 524/910 |
| 4,636,543 | 1/1987 | Helton | 524/109 |
| 4,699,940 | 10/1987 | Gerace et al. | 524/296 |
| 4,705,357 | 11/1987 | Dietch | 313402/402 |
| 4,762,703 | 8/1988 | Abrutyn | 524/555 |
| 4,981,891 | 1/1991 | Felter et al. | 524/913 |
| 5,037,875 | 8/1991 | de Garavilla | 524/910 |
| 5,149,181 | 9/1992 | Bedford | 351/166 |
| 5,149,724 | 9/1992 | Fahey et al. | 524/910 |
| 5,342,872 | 8/1994 | Huber | 428/294 |

FOREIGN PATENT DOCUMENTS

| | | | |
|---|---|---|---|
| 230044 | 12/1984 | Japan | 524/315 |
| 62-115 073 | 5/1987 | Japan . | |
| 1 176 484 | 7/1987 | Japan . | |
| 2 129 299 | 5/1990 | Japan . | |
| 4-171 013 | 6/1992 | Japan . | |
| 852929 | 8/1981 | U.S.S.R. | 524/913 |

*Primary Examiner*—Peter A. Szekely
*Attorney, Agent, or Firm*—Burns, Doane, Swecker & Mathis, L.L.P.

[57] ABSTRACT

Disclosed is a lens wafer suitable for use in preparing a laminated lens which wafer has a coating on at least one surface thereof in the form of a peelable protective film.

3 Claims, 1 Drawing Sheet

LENS WAFERS WITH REMOVABLE COATING

This application is a divisional of Application No. 08/379,328, filed Jan. 26, 1995.

BACKGROUND OF THE INVENTION

1. Field of the Invention

This invention relates to lens wafers and more particularly to a polymer composition for coating at least one surface of the lens wafer in order to provide a means to clean the wafer as well as to form a protective and removable film thereon.

2. State of the Art

Eyeglass lenses have traditionally been formed as a single integral body of glass or plastic. Grinding or molding such lenses to meet the specifications of a particular prescription requires costly equipment, highly skilled technicians and is time consuming.

It has recently been found that the fabrication of ophthalmic lenses can be economically accomplished in a more rapid manner with a laminated lens construction in which two lens wafers are bonded together with a transparent adhesive. Such lens wafers are described, for example, in U.S. Pat. Nos. 5,149,181, 4,857,553, and 4,645,317 and British Patent Application, publication number 2,260,937A which are incorporated herein by reference in their entirety.

The laminate construction enables assembly of composite lenses having any of a large number of different combinations of optical corrections from a relatively small stock of prefabricated lens wafers of different configurations. Pairing of different combinations of a front surface lens wafer with a back surface lens wafer can, for example, provide composite lenses having any of a large number of different powers as the power of the lens is the summation of the powers of the two wafers. Such combinations provide for a large majority of all of the prescriptions required for clear vision.

Notwithstanding the advantages of using lens wafers in the construction of a composite lens, a problem arises with the use of such lens wafers. Specifically, any contaminates such as dust, dirt, fingerprints and moisture found on the wafer surfaces to be glued will become permanently entrapped at the interface of the wafers in the composite lens upon adhesion of the front wafer to the back wafer resulting in defects in the lens. These defects reduce the optical quality of the finished lens and can ultimately lead to lens rejection.

Accordingly, in order to provide a defect-free composite lens, the wafer surfaces to be laminated together (with a transparent adhesive) should be substantially clean of such contaminates. However, since the wafers are invariably handled during composite lens fabrication, it is particularly difficult to avoid contaminates such as fingerprints and dust on the wafer surface interface.

The ability to maintain a contaminant-free surface is also critical if optical coatings such as anti-reflection coatings are to be applied. Again, any surface damage or contamination will be uncorrectable after application of the optical coating.

Previous methods known in the art neither address nor are applicable to this problem. For example, U.S. Pat. Nos. 3,899,315 and 3,899,314 relate to texture control of glass ophthalmic lenses by use of a protective layer which is removed prior to use. Here, a flat glass lens preform is provided with a thin protective layer of a chemically soluble glass fused thereto. In the manufacturing process, the flat preform is subsequently cut and pressed or slumped to the desired ophthalmic shape and the protective layer subsequently removed by dissolving this in a corrosive reagent, thereby exposing the underlying surface which, while smooth, nevertheless needs to be cleaned. The lens is rendered immediately adaptable to ophthalmic use, without further working (grinding, polishing or cleaning) of the surface. This wet process, however, is not suitable for reagent sensitive molded plastic (e.g., polycarbonates or polymethacrylates) lenses. Furthermore, it has been found that the wet process does not provide a sufficiently clean surface on lens wafers required for laminated ophthalmic lenses.

Another unrelated prior art approach to removing dust and grease from a polymer surface is disclosed in U.S. Pat. No. 4,199,375 which describes a method for removing dust and grease from phonograph records by applying a polyvinyl alcohol composition which forms a self-supporting film upon drying. When the film is lifted from the record, dust and grease, which are dissolved in the film, are removed. However, this composition, when applied to plastic lenses or lens wafers, forms films that are difficult to remove.

In view of the above, it would be particularly desirable to provide a means to effectively clean the surface of lens wafers prior to adhering this surface to another surface during fabrication of a laminated lens or application of a coating (e.g., an anti-reflection coating) to the wafer surface.

SUMMARY OF THE INVENTION

This invention is based, in part, on the discovery that formation of a self-supporting removable film on the surface of a plastic lens wafer which does not cross-link to the wafer surface provides an effective method to clean the surface of the lens. Additionally, the removable film provides a level of abrasion protection to the underlying surface.

Accordingly, in one of its method aspects, this invention is directed to a method of cleaning at least one surface of a lens wafer from contaminates which method comprises:

(a) applying a film forming composition onto at least one surface of a lens wafer, said composition comprising:
 (i) a film forming unmodified polymer, and
 (ii) a compatible solvent;

(b) removing the solvent from said composition to form a self-supporting removable film that coats the surface of the wafer to which it was applied without being cross-linked thereto which film encapsulates therein at least a portion of the contaminates found on the wafer surface prior to application of the composition thereto; and (c) removing said film from the surface of the wafer.

In another of its method aspects, this invention is directed to a method for reducing defects at the interface of front and back lens wafers in a laminated lens wherein the front and back lens wafers are bonded together at the surfaces interfacing with each other with a transparent adhesive which method comprises:

(a) applying a film forming composition onto the interface surfaces of both the front and back lens wafers, said composition comprising:
 (i) a film forming unmodified polymer; and
 (ii) a compatible solvent;

(b) removing said solvent to form a self-supporting removable film that coats the surface of the wafer to which it was applied without being cross-linked thereto which film encapsulates therein at least a portion of the contaminates found on the wafer surface prior to application of the composition thereto;

(c) removing said film from the surface of the wafer;

(d) applying a transparent adhesive to at least one of said interface surfaces; and (e) bonding the front lens wafers to the back lens wafer through the interface surfaces of said wafers to form a laminated lens.

In one of its composition aspects, this invention is directed to a lens wafer suitable for use in preparing a laminated lens, said wafer containing on at least one surface thereof a self-supporting removable film wherein said film is not cross-linked to said wafer surface and further wherein said film encapsulates at least a portion of the contaminates found on the lens surface prior to placement of said film thereon.

Upon removal of the film from the lens wafer surface, the contaminates encapsulated with the film are removed from this surface. Preferably, the film has a thickness, in the dry state (after solvent evaporation), of from about 8 to about 50 $\mu$m (microns), more preferably from about 8 to about 20 $\mu$m, and still more preferably from about 10 to 15 $\mu$m.

In another of its composition aspects, this invention is directed to a lens wafer suitable for use in preparing a laminated lens said wafer containing on at least one surface thereof a self-supporting removable film wherein said film is prepared by the process which comprises:

(a) applying a film forming composition onto a surface of the lens wafer, said composition comprising:
   (i) a film forming unmodified polymer; and
   (ii) a compatible solvent; and (b) removing said solvent to form the removable film that coats the surface without being cross-linked thereto.

In a preferred embodiment, the film forming unmodified polymer comprises a copolymer of vinyl chloride and vinyl acetate. More preferably, the copolymer of vinyl chloride and vinyl acetate comprises from about 75 to about 98 weight percent vinyl chloride and from about 2 to about 25 weight percent vinyl acetate. In still a more preferred embodiment, such copolymers have a molecular weight of from about 15,000 to about 70,000.

In still another preferred embodiment, the polymer composition further comprises a second copolymer of vinyl chloride and vinyl acetate that has an average molecular weight of about 40,000 to 50,000 wherein the second copolymer comprises about 80 to 90 weight percent vinyl chloride and about 10 to 20 weight percent vinyl acetate. The polymer composition comprising the first and second copolymers preferably has a weight ratio of the first copolymer to the second copolymer of from about 8:1 to about 19:1. A particularly preferred polymer composition comprises about 94 weight percent of the first copolymer and about 6 weight percent of the second copolymer.

In yet another composition aspect, this invention is directed to a composition comprising:

(1) from about 60 to about 95 weight percent, based on the total weight of the composition, of a solvent mixture comprising acetone and n-amyl acetate as the compatible solvent;

(2) from about 5 to about 25 weight percent, based on the total weight of the composition, of a film forming unmodified polymer;

(3) from about 10 to about 35 weight percent, based on the total weight of solids in the film forming composition, of a plasticizer comprising dipropylene glycol dibenzoate; and (4) from about 0.1 to about 5 weight percent, based on the weight of the composition, of an anti-static agent.

In another of its compositional aspects, the invention is directed to a composition suitable for forming a self-supporting removable polymeric film on at least one surface of a lens wafer suitable for forming a composite lens which composition comprises:

(a) a first copolymer that comprises from about 75 to 98 weight percent vinyl chloride and about 2 to 25 weight percent vinyl acetate and that has an average molecular weight of about 25,000 to 28,000;

(b) a second copolymer that comprises about 80 to 90 weight percent vinyl chloride and about 10 to 20 weight percent vinyl acetate and that has an average molecular weight of about 40,000 to 50,000
   wherein the weight ratio of said first copolymer to said second copolymer ranges from about 8:1 to about 19:1; and (c) a compatible solvent.

Preferably, the compatible solvent is selected from the group consisting of acetone, ethyl acetate, amyl acetate, butyl acetate, and mixtures thereof.

DETAILED DESCRIPTION OF THE INVENTION

This invention is directed to methods and compositions for cleaning lens wafers for use in preparing optically corrective laminated plastic lenses. The methods and compositions of this invention employ a self-supporting removable film on at least one surface of the wafer which film is not cross-linked to the wafer but which film encapsulates therein at least a portion of the contaminates found on the surface of the lens wafer.

However, prior to addressing this invention in further detail, the following terms will first be defined:

Definitions

Figure 1:
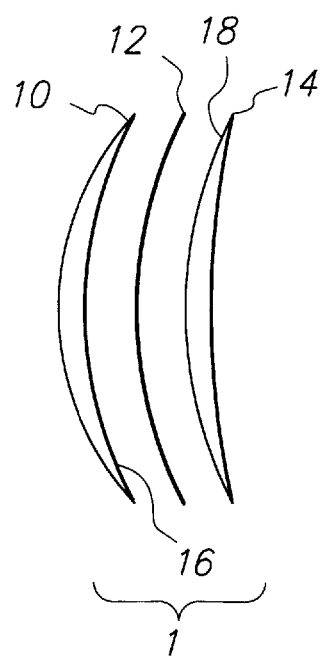
FIG. 1 illustrates an exploded laminated lens comprising a front lens wafer, a transparent adhesive layer and a rear lens wafer.

The term "lens wafer" or "wafer" refers to an article comprising a plastic material which article is either the front or back segment of a composite lens which segments are combined and bonded together by use of a transparent adhesive. Such lens wafers are depicted in FIG. 1 as elements 10 and 14. Plastic materials useful in preparation of lens wafers are well known in the art and include, by way of example, polycarbonates, polymethacrylates, and the like. The particular plastic material employed is not critical. However, preferred plastic materials are polycarbonates and, in particular, an allyl diglycol carbonate available from PPG Industries, Hartford, Conn., USA under the tradename CR-39™.

The term "transparent adhesives" refers to adhesives suitable for bonding lens wafers together which adhesives are optically transparent in the visible light portion of the spectrum and preferably UV curable. Such transparent adhesives are disclosed in U.S. Pat. Nos. 5,149,181, 4,857,553, and 4,645,317 and British Patent Application, publication number 2,260,937A. The particular transparent adhesive employed herein is not critical but preferably is a UV curable adhesive sold under the tradename MULTI-CURE 492 available from Dymax, Inc., Torrington, Conn., USA.

The term "a film-forming unmodified polymer" refers to a polymer or mixture of polymers, including copolymers, that are soluble or suspendable in a compatible solvent such that upon removal of the solvent a film is formed on the surface to which the polymer solution or suspension was applied and which polymers do not contain sufficient functional groups (and preferably no functional groups) so as to result in cross-linking of the polymer to the lens wafer surface. Cross-linking of the polymer to the lens wafer surface refers to covalent or ionic binding of functional groups on the polymer to complementary functional groups found on the surface of the wafer. Such binding (cross-linking) is particularly detrimental since it inhibits the ability to lift the resulting film off the wafer to leave a clean surface (e.g., without leaving traces of the polymer) without deleteriously affecting the surface of the lens wafer.

Generally, unmodified polymers do not have sufficient reactive moieties, such as hydroxyl, carboxyl, epoxy, or amino functionalities, that could bind (cross-link) with complementary reactive functionalities on the substrate surface thereby forming a covalent or ionic linkage therebetween. For example, it is believed that the hydroxyl functionality will readily cross-link with plastic substrates by forming ester and/or ether bonds with complementary reactive groups on the wafer surface (e.g., carboxyl groups and epoxide groups).

Preferred film forming unmodified polymers have a number average molecular weight of from about 15,000 to about 70,000, preferably 20,000 to 45,000 and most preferably from about 25,000 to about 28,000. The use of polymers having lower molecular weights facilitates the preparation of high solid content solutions of these polymers in the compatible solvent. High solid contents are particularly desirable in areas where solvent emissions are restricted on the basis that solvent coating techniques are limited to high solid contents.

In a particularly preferred embodiment, the film forming unmodified polymer comprises a copolymer of vinyl chloride and vinyl acetate. More preferably, the copolymer of vinyl chloride and vinyl acetate comprises from about 75 to about 98 weight percent vinyl chloride and from about 2 to about 25 weight percent vinyl acetate. In still a more preferred embodiment, such copolymers have a number average molecular weight of from about 25,000 to about 28,000.

In still another preferred embodiment, the polymer composition further comprises a second copolymer of vinyl chloride and vinyl acetate that has an average molecular weight of about 40,000 to 50,000 wherein the second copolymer comprises about 80 to 90 weight percent vinyl chloride and about 10 to 20 weight percent vinyl acetate. The polymer composition comprising the first and second copolymers preferably has a weight ratio of the first copolymer to the second copolymer of from about 8:1 to about 19:1. A particularly preferred polymer composition comprises from about 94 weight percent of the first copolymer and about 6 weight percent of the second copolymer.

It has been found that the presence of such a second unmodified polymer in the polymer composition produces films with enhanced physical characteristics such as increased tensile properties which facilitate the stripping of the film from the substrate. Specifically, the addition of this second unmodified polymer having a higher average molecular weight than that of the first improves the physical properties of the film.

When the unmodified polymer comprises vinyl resins such as copolymers of vinyl chloride and vinyl acetate, a preferred solvent comprises a mixture of acetone and n-amyl acetate. The acetone is present from about 60 weight percent to 100 weight percent, and preferably at about 95 weight percent of total solvent; the n-amyl acetate is present from 0 weight percent to about 40 weight percent, preferably from about 1 to about 5 weight percent and still more preferably at about 5 weight percent of total solvent. This solvent mixture has the advantage of dissolving the vinyl copolymer at room temperature. The n-amyl acetate, which is a slow-evaporating solvent, facilitates application of the composition to lens substrates and, in particular, allows the composition to flow over the substrate to achieve a uniform coating.

The term "compatible solvent" refers to a solvent or mixture of solvents which dissolve or suspend the film forming unmodified polymer(s) and other components of the polymer composition which solvent is not deleterious to the surface of the lens wafer. Solvents should be sufficiently volatile so that once the polymer composition is applied onto a substrate surface, the solvent can be removed to form the film preferably without the aid of heat and/or vacuum. Additionally, the solvent should preferably have a solvent cleaning affect on the surface of the lens wafer such that at least a portion of the contaminants found on the surface of the lens are dissolved or suspended in the solution (i.e., solvent + film-forming unmodified polymer). Preferred solvents include acetone, ethyl acetate, amyl acetate, butyl acetate, etc., and mixtures thereof.

The term "self-supporting removable film" refers to a polymer film having sufficient tensile strength and modulus such that the film stability (i.e., in a stable film form) is independent of the lens wafer surface to which it is applied and which film does not cross-link with the wafer surface thereby permitting complete peeling therefrom, preferably as a single piece.

The term "contaminants" refer to exogenous materials found on the interface surface of a lens wafer which can become entrapped at the interface of the wafers in a laminated lens resulting in defects to the lens. Such contaminants include, by way of example, dust, dirt, fingerprints (including oils associated therewith), moisture, etc.

Formulation

This invention is directed to the discovery that the formation of a self-supporting removable film on the surface of the lens wafer provides an effective means to dissolve and/or encapsulate at least a portion of the contaminants on the surface of the film. Upon removal of the film from the lens wafer surface, the contaminates dissolved and/or encapsulated within the film are removed from this surface. The film provides the additional advantage of protection from abrasion for the surfaces of the wafer covered by the film.

Figure 2:
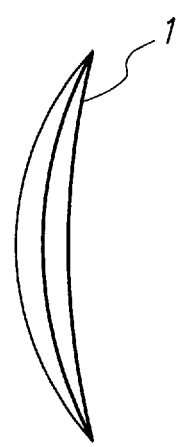
FIG. 2 illustrates the laminated lens of FIG. 1 in combined form which lens is suitable for use in corrective glasses.

Specifically, FIG. 1 is an exploded view of the elements used to produce a laminated lens 1. Transparent adhesive layer 12 is used to bond the front lens wafer 10 to rear lens wafer 14. Viewing the lens from left to right, the rear surface 16 of front lens wafer 10 and the front surface 18 of rear lens wafer 14 are the interface surfaces for each wafer in the bonded lens. FIG. 2 illustrates the composite (laminated) lens 1 in assembled form.

In this invention, it is desirable to clean at least a portion of the contaminants on the interface surfaces 16 and 18 of front and back wafers 10 and 14 respectively prior to bonding these wafers together with the transparent adhesive layer 12. Specifically, cleaning is accomplished by first applying a composition comprising a solvent solution or suspension of a film forming unmodified polymer that forms a self-supporting and removable film when applied to the surface of the plastic lens wafer, subsequent removal of the solvent to form the removable film and then, at some point in time subsequent thereto, removal of the film.

In this composition, the compatible solvent is typically employed in an amount of from about 60 to about 95 weight percent of the total weight of the film-forming composition and preferably from about 70 to about 80 weight percent. The use of lower amounts of compatible solvent is preferred when emission of solvent to the atmosphere is of concern. The film forming unmodified polymer is employed in this composition in an amount of from about 5 to about 25 weight percent, based on the total weight of the composition, and preferably from about 15 to about 23 weight percent.

In a preferred embodiment, the polymer employed in the film forming composition comprises a copolymer comprising about 86 percent vinyl chloride and 14 percent vinyl acetate and having an average molecular weight of about 27,000. In another embodiment, the polymer composition, further comprises a second copolymer comprising about 90 percent vinyl chloride and 10 percent vinyl acetate and having an average molecular weight of about 44,000. The second copolymer is preferably present at from 5 to 20 percent by weight of total copolymer.

The film forming composition described above can optionally contain additives such as anti-static agents, plasticizers, anti-oxidants, etc. Plasticizers are typically employed to improve film flexibility and peelability and, when employed, are present at from about 20 percent to about 30 percent by weight based on total solids (i.e., exclusive of solvent) content. Suitable plasticizers include, by way of example, dipropylene glycol dibenzoate, butyl benzyl phthalate, diethylene glycol dibenzoate, and the like. The particular plasticizer employed is not critical but preferably is dipropylene glycol dibenzoate.

Anti-static agents are typically employed to reduce the amount of static charge created especially when peeling the film from the composite lens. When employed, the composition comprises from about 0.1 to about 5 weight percent of the anti-static agent based on the total weight of the composition and preferably about 1.5 weight percent. Suitable anti-static agents include, by way of example, Glycolube AFA™ (available from Lonza, Inc., Fair Lawn, N.J., USA), glycerol monooleate, polyoxyethylene sorbitan monooleate, and the like. Alternatively, after peeling the removable film from the wafer surface, the wafer surface can be exposed to a bipolar ionized air shower to reduce static.

The above composition is preferably prepared by the addition of the film forming unmodified polymer to the compatible solvent. The rate of addition is monitored and maintained at a sufficiently slow rate to inhibit lumping of the polymer. Mixing is conventionally conducted in a high shear mixer preferably equipped with a tight fitting cover to prevent solvent loss.

Methodology

In operation, the film forming composition prepared as above is applied to at least one surface of lens wafer suitable for forming a composite lens. Preferably, the film forming composition is applied to the interface surface of both the front and back lens wafers. In one embodiment, the film forming composition is applied only to the interface surfaces of both the front and back lens wafers. In another embodiment, the film forming composition is applied to all of the surfaces of the lens wafer.

Application is typically conducted in a manner to provide substantially uniform application of the film forming composition onto the lens wafer surface. Application means include, by way of example, roll coating, dip coating, painting, spin coating, etc. Application by a spin coating process gives an upper thickness limit of about 20 $\mu$m.

In some cases it may be desirable to add solvent to the film-forming composition during active coating of the wafer surface to maintain the desired solvent level. Solvent addition can be either incremental or continuous and compensates for solvent loss during coating.

Sufficient amounts of the film forming composition are applied onto the surface or surfaces of the lens wafer to provide for a film thickness, in the dry state (after solvent evaporation), of from about 8 to about 50 $\mu$m (microns), more preferably from about 8 to about 20 $\mu$m, and still more preferably from about 10 to 15 $\mu$m. Film thickness of at least 8 $\mu$m is necessary to insure that the film is strong enough to exhibit good peelability. As is apparent, a thicker film will also afford greater abrasion resistance.

The coating should be coextensive with the surface(s) of the lens wafer so that after solvent removal, a film is formed which is closely juxtaposed to the wafer surface and remains attached until it is peeled off and the lens wafer is ready for use. Accordingly, attachment is made by proximate location of the film coextensive with the surface of the wafer. There is, however, no chemical binding, whether covalent or ionic, between the film and the wafer and, accordingly, the film is peelable.

The methodology employed to form the film results in a cleaning effect on the wafer surface upon removal of the film. Without being limited to any theory, it is believed that the solvent employed in the film forming composition suspends or dissolves a portion of the contaminants when applied to the surface of the wafer. Upon evaporation of the solvent, the contaminants are believed to become encapsulated in the film and, upon film removal, a cleaning effect of the wafer surface is achieved.

In addition to cleaning the wafer surface, the removable film also provides abrasion protection for the surface to which it was applied. Accordingly, it is advantageous to form the removable film on at least one surface of the wafer at the time of manufacture and remove the film at the time of forming the corrective lens thereupon retaining this film on the surface of the wafer during shipment and storage. However, while less advantageous, this invention also encompasses application of the film to the lens wafer surface immediately prior to forming the corrective lens so as to effectively clean the lens surface prior to lamination. In this embodiment, it may be desirable to repeat application and removal of the film to the surface to provide for higher levels of cleaning.

It is contemplated that the self supported removable film described above can also be employed to clean the surface of any plastic lens, regardless of whether the lens is of laminate construction. Such cleaning would be required prior to, for example, application of an anti-reflective coating to the lens. In this embodiment, the lens is first cleaned in the manner described above and then treated with the anti-reflective coating. The cleaning step prior to application of the anti-reflective coating ensure that contaminates on the lens surface are not permanently entrapped into the lens/anti-reflective coating interface. All of the parameters discussed above relating to cleaning of lens wafers would be applicable to the cleaning of the lens itself.

Embodiments of the invention are now described by way of the following non-limiting examples.

In these examples, the following abbreviations have the meanings set forth below. If not defined, the abbreviations have their art recognized meanings.

g=grams
min.=minutes
Mn=number average molecular weight
μm=microns (micrometers)

EXAMPLES

Example 1 describes preparation and application of a film forming unmodified composition to form a protective film on a plastic lens wafer. Example 2 describes the same technique except that the unmodified polymer employed comprises of a mixture of vinyl chloride and vinyl acetate copolymers. Comparative Example A describes films formed from a polymer composition wherein the vinyl chloride and vinyl acetate copolymer has a hydroxyl content of about 2.3 percent. As is apparent, the presence of the hydroxyl groups forms a film that strongly bonds to the substrate and therefor is unsuitable for use as a peelable protective film.

Example 1

441 g of a copolymer of vinyl chloride and vinyl acetate having approximately 86 weight percent vinyl chloride and about 14 weight percent of vinyl acetate and a number average molecular weight of about 27,000 (available from Union Carbide Chemicals and Plastics Co., Danbury, Conn., USA under the tradename UCAR Solution Vinyl Resin VYHH™) was added to a solvent blend comprising 1,330 g acetone and 70 g amyl acetate. The VYHH™ was added slowly under agitation at room temperature and in a sealed container in order to prevent clumping and solvent loss. A high shear mixer was used to provide the required agitation. Dissolution of the copolymer required almost one hour. 150 g of a plasticizer consisting of dipropylene glycol dibenzoate (available under the tradename Benzoflex 9–88™ from Velsical Chemical Corp., Rosemont, Ill., USA) was then added to the mixture, and the mixture stirred for five minutes. This was followed by the addition of 9 g of an anti-static agent (available under the tradename Glycolube AFA-1™ from Lonza, Inc., Fair Lawn, N.J., USA). The polymer composition was stirred for 10 min. prior to application. The composition comprised about 30 percent solids by weight.

Table 1 lists the components and proportions in the polymer composition.

TABLE 1

| COMPONENT | WEIGHT (gram) | WEIGHT (percent) | SOLIDS (percent) |
|---|---|---|---|
| VYHH ™ | 441 | 22.05 | 73.50 |
| BENZOFLEX 9-88 ™ | 150 | 7.50 | 25.00 |
| GLYCOLUBE AFA-1 ™ | 9 | 0.45 | 1.50 |
| ACETONE | 1330 | 66.50 | 0 |
| AMYL ACETATE | 70 | 3.50 | 0 |
| TOTAL | 2000 | 100 | 100 |

The polymer composition of Example 1 was applied to an ophthalmic lens wafer substrate formed of a polymerized allyl diglycol carbonate (available as CR-39™ PPG Industries, Hartford, Conn., USA). The composition was applied by spin coating whereby the lens is mounted on a rotatable spindle and rotated at a high speed to disperse the liquid over the moving surface to attain a coating of uniform thickness. The coating was allowed to dry at ambient conditions to form a solid film on the lens wafer. Preferably, the film is about 10 μm thick.

The film was removed by attaching adhesive tape to an edge region of the substrate and withdrawing the tape from the substrate to peel the film away. The film exhibited good peelability and cleaning effectiveness as it was able to remove surface dust and grease-based contaminants (e.g., fingerprints) without breaking up.

Example 2

The procedure described above in Example 1 was carried out, with the replacement of the single VYHH™ copolymer with a mixture of VYHH™ and UCAR Solution Vinyl Resin VYNS-3™ (also available from Union Carbide Chemicals and Plastics Co., Danbury, Conn., USA) which is another vinyl chloride/vinyl acetate copolymer, which comprises about 90 percent vinyl chloride and about 10 percent vinyl acetate and has a number average molecular weight Mn of about 44,000. The proportion of VYHH™ to VYNS-3™ was about 95 percent VYHH™ to 5 percent VYNS-3™, by weight.

The mixture was prepared by adding VYNS-3™ slowly to acetone under agitation for almost one hour until the VYNS-3™ dissolved. After complete dissolution of the VYNS-3™, the VYHH™ was slowly added, requiring also approximately one hour for complete dissolution. Thereafter the plasticizer and anti-static agent were added to the mixture, and the final composition applied to a lens surface by spin coating. The resultant film exhibited particularly good film properties in terms of film tear strength and toughness.

COMPARATIVE EXAMPLE A

The procedure of Example 1 was repeated but the copolymer used was a vinyl chloride/vinyl acetate copolymer with vinyl alcohol in the polymer backbone (available as VAGH™ from Union Carbide), and having a vinyl chloride content of about 90 percent, about 4 percent vinyl acetate, with a hydroxyl content of about 2.3 percent and a number average molecular weight of about 27,000.

The film was evaluated for its strippable characteristics from a CR-39™ lens wafer substrate. It was found that the film adhered strongly to the substrate, and could not be stripped therefrom. This is due to cross linking with the plastics lens wafer substrate as a result of the hydroxyl functionality.

The subject matter disclosed herein is also found in our priority British Patent Application No. 9403792.6 which is incorporated herein by reference in its entirety.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:
1. A composition comprising:
   (1) from about 60 to about 95 weight percent, based on the total weight of the composition, of n-amyl acetate as a compatible solvent;
   (2) from about 5 to about 25 weight percent, based on the total weight of the composition, of a film forming unmodified polymer;
   (3) from about 10 to about 35 weight percent, based on the total weight of solids in the film forming composition, of a plasticizer comprising dipropylene glycol dibenzoate; and

(4) from about 0.1 to about 5 weight percent, based on the total weight of the composition, of an anti-static agent.

2. A composition suitable for forming a self-supporting removable polymeric film on at least one surface of a lens wafer suitable for forming a composite lens which composition comprises:

(a) a first copolymer that comprises from about 75 to 98 weight percent vinyl chloride and about 2 to 25 weight percent vinyl acetate and that has a number average molecular weight of about 25,000 to 28,000;

(b) a second copolymer that comprises about 80 to 90 weight percent vinyl chloride and about 10 to 20 weight percent vinyl acetate and that has a number average molecular weight of about 40,000 to 50,000 wherein the weight ratio of said first copolymer to said second copolymer ranges from about 8:1 to about 19:1; and (c) a compatible solvent which dissolves the first and second copolymer.

3. The composition of claim 2 wherein said compatible solvent is a mixture of acetone and amyl acetate.

* * * * *